United States Patent
Zinter et al.

[11] Patent Number: 5,870,972
[45] Date of Patent: Feb. 16, 1999

[54] HIGH INTENSITY SONIC PASTURE GATE

[76] Inventors: Barney J. Zinter; Sidney Gene Zinter, both of Rte. 1 Box 23, Ione, Oreg. 97843

[21] Appl. No.: 786,017

[22] Filed: Jan. 21, 1997

[51] Int. Cl.[6] .................................................. A01K 29/00
[52] U.S. Cl. .............................................................. 119/719
[58] Field of Search .................................... 119/719, 720, 119/721

[56] References Cited

U.S. PATENT DOCUMENTS

| | | | |
|---|---|---|---|
| 5,009,192 | 4/1991 | Burman | 119/719 |
| 5,458,093 | 10/1995 | MacMillan | 119/720 |
| 5,603,287 | 2/1997 | Houck | 119/719 |
| 5,640,932 | 6/1997 | Bianco et al. | 119/720 |

*Primary Examiner*—Thomas Price

[57] ABSTRACT

An internal, rechargable, battery operated device for outdoor use in deterring livestock from passing through an open gate in a fence. The device incorporates a detector which senses the body heat of a large approching animal and relays a signal to a special siren, thus producing high intensity ear-splitting sound waves to frighten them away. The sensing mechanism is of the type capable of detecting infrared heat generated by the animal's body. The operating principle of this invention is very straightforeward. However, its uniqueness lies not only in the application of this technology but also in the electronic circuit which operates and controls the device. The device is ruggedly constructed to whithstand the rigors of farm, ranch, or industrial use in all kinds of weather and is inexpensive and easy to install using its built in hanger.

17 Claims, 6 Drawing Sheets

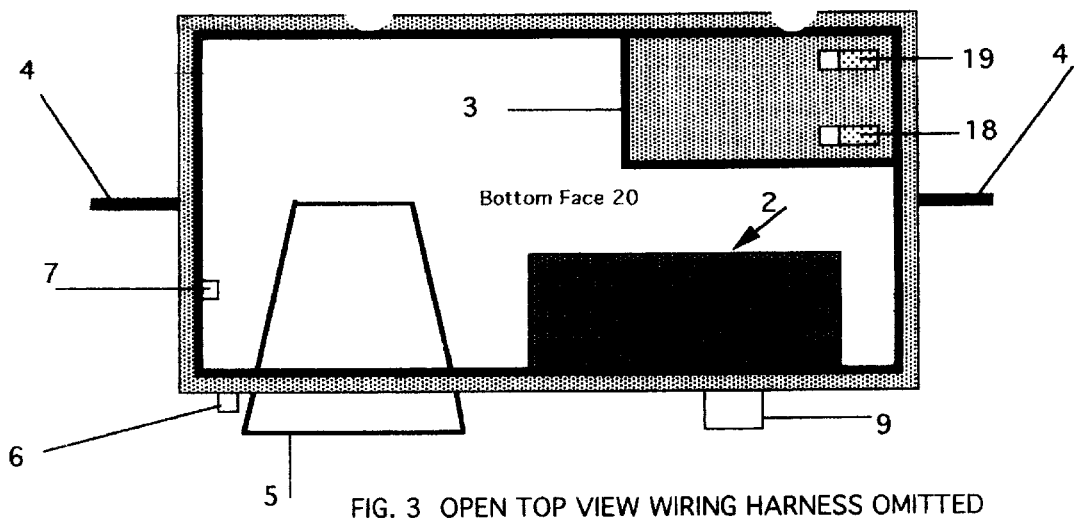
FIG. 3 OPEN TOP VIEW WIRING HARNESS OMITTED
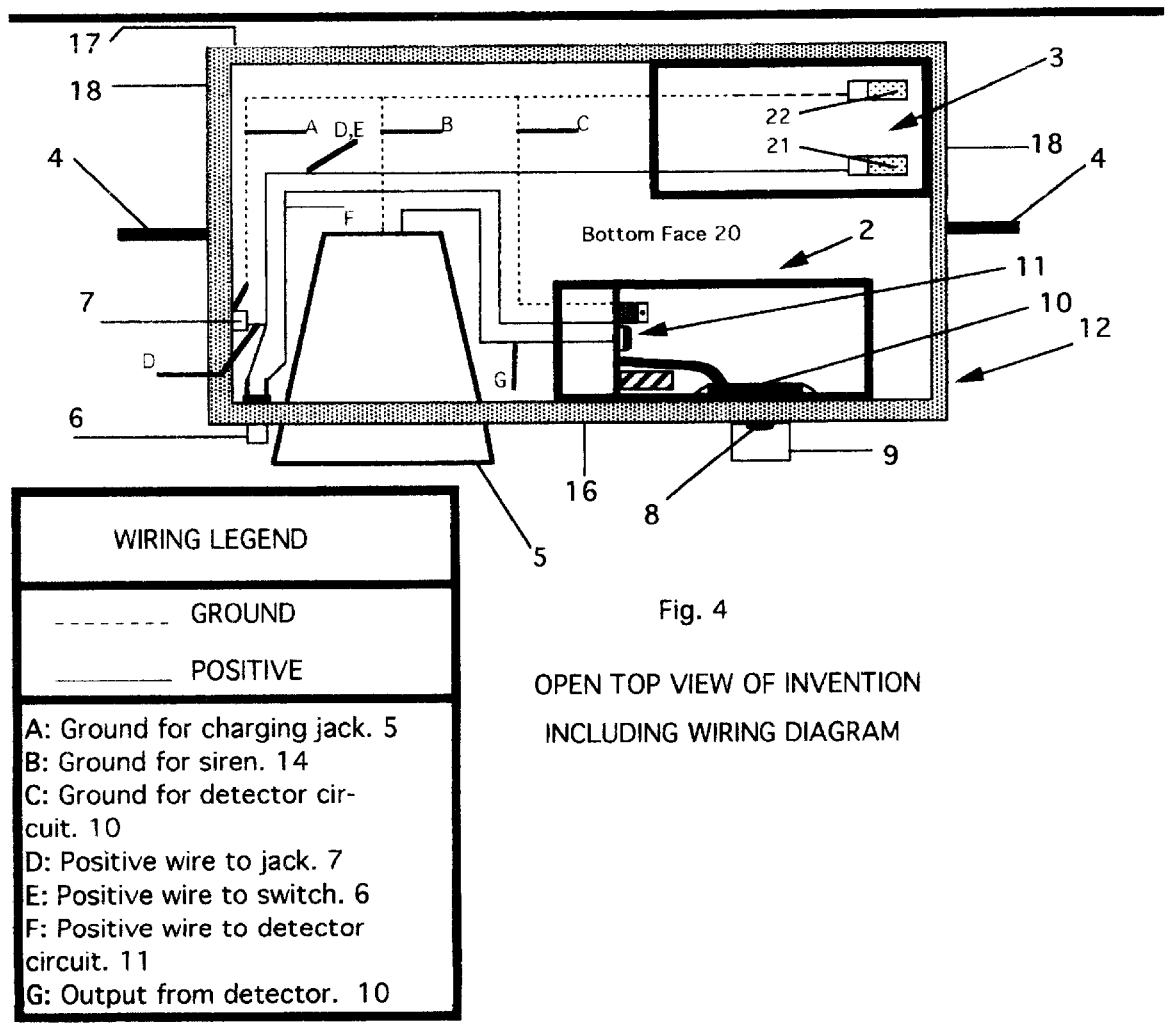
| WIRING LEGEND |
|---|
| - - - - - - GROUND |
| ———— POSITIVE |
| A: Ground for charging jack. 5 |
| B: Ground for siren. 14 |
| C: Ground for detector circuit. 10 |
| D: Positive wire to jack. 7 |
| E: Positive wire to switch. 6 |
| F: Positive wire to detector circuit. 11 |
| G: Output from detector. 10 |
Fig. 4
OPEN TOP VIEW OF INVENTION
INCLUDING WIRING DIAGRAM

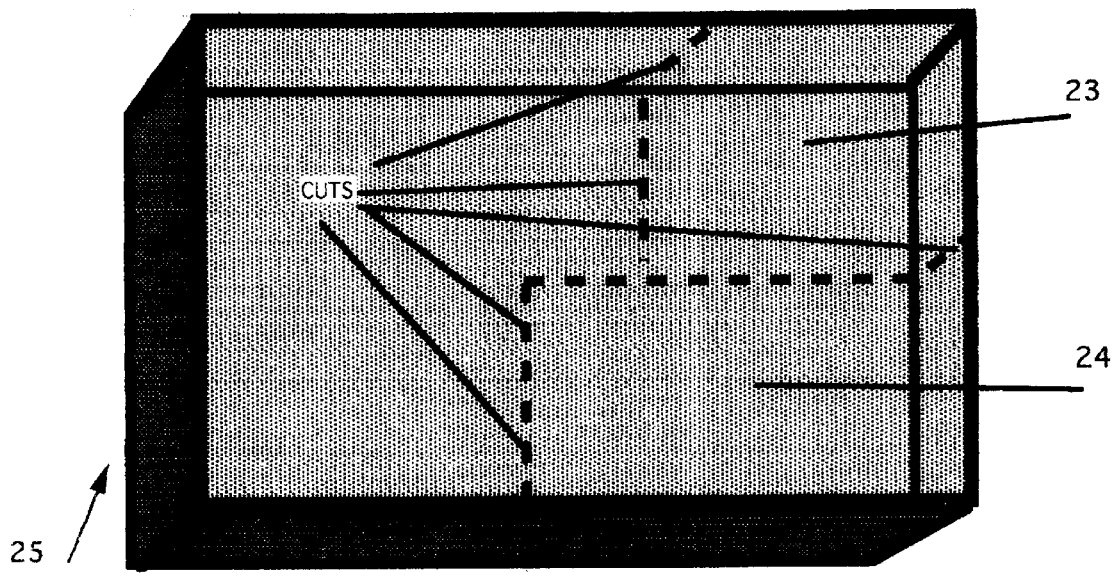
Fig. 6 plastic tray showing needed cuts to make battery holddowns
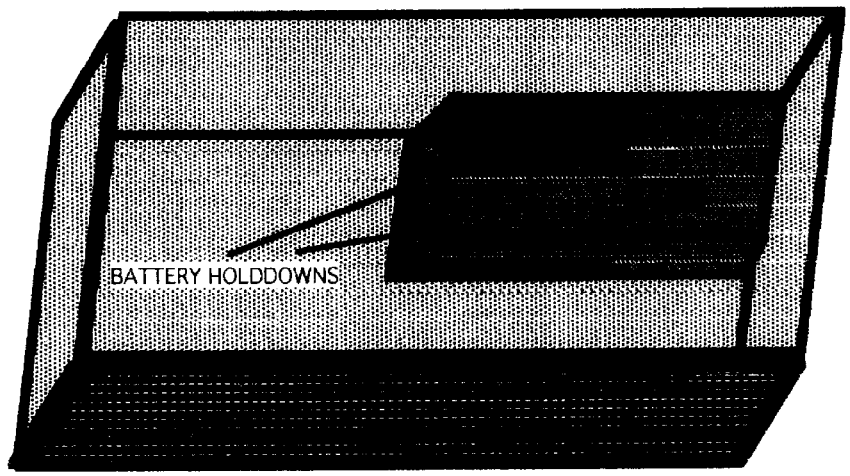
Fig. 7 siren, detector box, switch, jack and wiring harness omitted

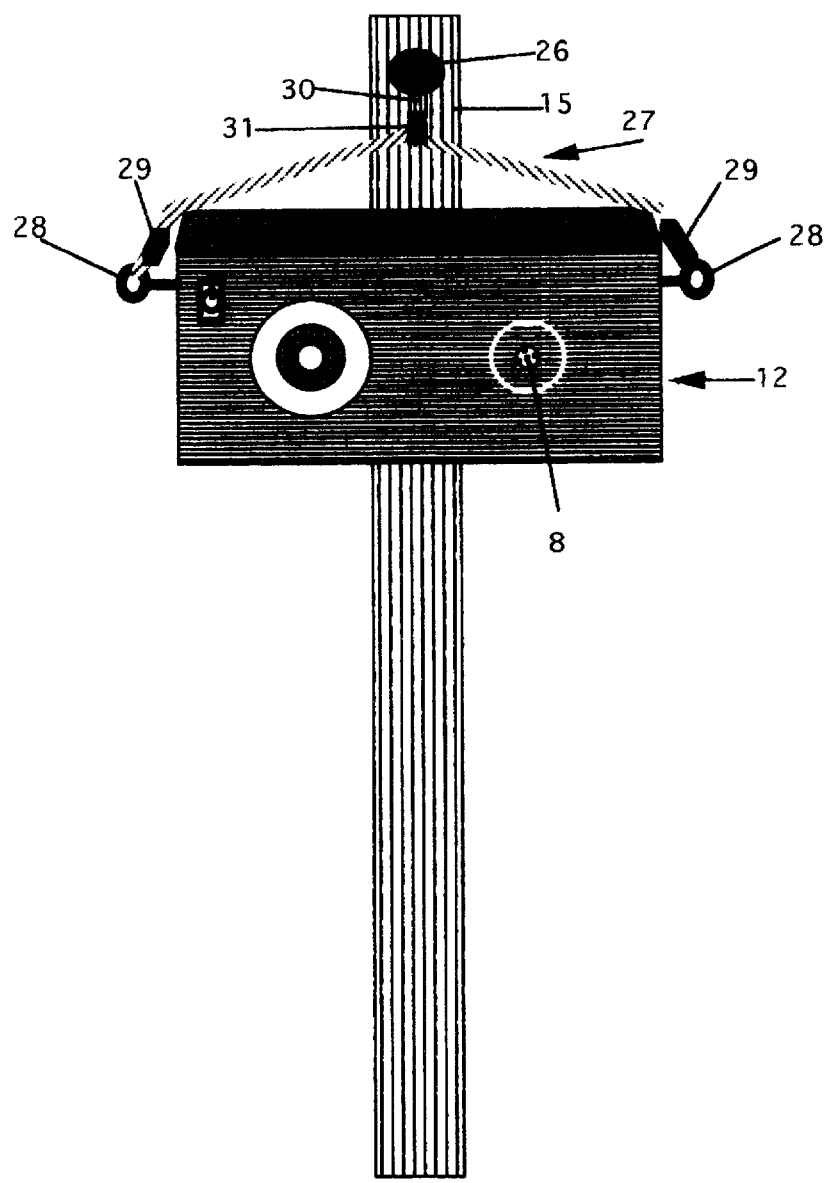
Fig. 8 Prespective front view of unit installed on a gate post.

CIRCUIT PARTS AND HARDWARE LIST.

C 1: 22 micro farads 25 volt.
C 2: 4700 micro farads 16 volt.
D 1: 1n4001.
D 2: 1n4001.
D 3: 1n4001.
Q 1: 2n2222.
R 1: 470K.
R 2: 100K.
R 3: 44.2K.
IC 1: LM317T adj. voltage regulator.
Relay 1: 9 volt - single pole, single throw.
P.I.R. Module: Commercially manufactured P.I.R. module.
Siren: Six tone, 12 volt, 120 db. siren.
Circuit board: 1 3/4" x 3 1/4" perfboard.
Plastic project box: 6" x 3 1/2" x 2" (houses circuit board).
Switch 1: single pole-single throw, toggle (heavy duty).
Jack 1: 2.5 mm micro phone jack (for recharging battery 1).
Battery 1: 12 volt, 7 amp.-hr. Gelcel.
16 inch X eight inch X eight inch plastic box.
Mic. hardware and hookup wire.
Liquid silicone sealant.
12 volt 200 milliampre D.C. battery charger.
1 plastic tray: one and one half inches deep x eight x ten.
1: one and one-half inch pvc pipe, male threaded adapter (use to make lens shield).
Four feet of eighth-inch aircraft cable and three ferrules.
Two 1/4 inch x one inch long eye bolts.

fig. 9

HIGH INTENSITY SONIC PASTURE GATE

FIELD OF THE INVENTION

The present invention relates to the livestock industry—primarily cattle fencing systems. It was designed to replace manually operated steel, wire, or board gates or a steel cattle guard. This invention is essentially, a gate that you do not have to open or close.

BACKGROUND OF THE INVENTION

Fences are an integral part of the livestock industry. Good husbandry requires that cattle be contained with some type of fencing, not only for their own safety and well being but also out of respect for the property rights and saftey of others.

Almost all livestock fencing systems have gates of some type to allow vehicles to pass from one side of the fence to the other when open, and then when closed, prevent the contained livestock (mainly cattle) from leaving the containment area. For years, gates have been made out of barbed wire, boards or steel. In recent times, gates have often been replaced by devices known in the industry as "cattle guards". These cattle guards consist of a flat grate made from heavy steel pipe or beams welded to cross members at approximately six inch spacings, spanning the width of the road and positioned over a deep narrow trench. A vehicle can then pass over the cattle guard's grate but cattle will usually not attempt to because they perceive the cattle guard as a regular part of the fence.

However, there are serious problems associated with both conventional gates and cattle guards.

FIRST: If they are located in high use areas they will require high maintenance.

SECOND: They are difficult to construct and install.

THIRD: They are expensive, especially cattle guards which usually cost upwards of $1,000 dollars and generally require at least two days to install.

FORTH: They are a potential source of injury both to personnel and to livestock, as anyone acquainted with barbed wire knows. Furthermore, cattle occasionally attempt to cross a cattle guard, and when they do, they usually get their legs caught between the steel beams. This results in severe trauma and injury to the animal which may be extensive enough to require euthanasia.

FIFTH: Gates are a "hassle" to deal with. One of the most aggravating, annoying and time consuming tasks for a livestock producer is having to open and close gates. Which consists of driving up to the gate, stopping your vehicle, getting out, walking through the mud to the gate, opening the gate, walking back to your vehicle, clean the mud off your feet, get back in your vehicle, drive through the gate, stop your vehicle, get back out, walk back through the mud to the gate, shut the gate, walk back to your vehicle, clean your feet and then get back in your vehicle and drive on. This invention addresses all of these problems and provides a simple and relatively inexpensive alternative to both gates and cattle guards. It costs about one-fifth of the price of a cattle guard and can be installed and fully functional in about five minutes.

SUMMARY OF THE INVENTION

The present invention is a battery operated electronic monitoring and sound generating livestock containment device which, when installed in one side of an opening in a fence, provides a means for vehicles and personnel to pass through, and scares cattle away when they try to pass. In its present embodiment, this invention uses an infrared heat sensor whose eye "looks" from one side of the gate opening to the other, in a fan shaped pattern (see FIG. 2). When an animal or anything radiating heat moves into the sensor's field of view, the devise turns on a siren which generates a "gate" of high intensity "frighting, discomforting and earsplitting" tones, which are completely intolerable to the animal. These tones are of a specific and of sufficient intensity to cause "discomfort" but no immediate harm to animals (or humans). After the device activates, the animal will be instantaneously "frightened" and will retreat from the fence opening. The unit will then remain on for six to ten seconds then turn off and rearm itself.

The entire embodiment of this invention is contained in a weathertite plastic box approximately sixteen inches long× seven inches high×eight inches wide. Its internal power supply is a completely sealed lead-acid gelcell 12 volt battery. This battery can be recharged as needed through a jack mounted on the side of the case using an external charger. The power requirements of the invention are so minimal that it will operate three months on a single charge. An internal box contains the electronic circuits which allow the siren to remain "on" for a predetermined time after the detector module has turned off. Another circuit allows the six-tone siren to produce its tones in such a way that they appear random rather than sequential. This longer "on" time, together with the random tones, precludes the possibility of animals becoming desensitized to the sound. These and other features and advantages of the present invention will become more apparent to those skilled in the art from the following detailed discription of the prefered embodiment taken with refrence to the acompanying figures.

BRIEF DESCRIPTION OF THE DRAWINGS

The foregoing aspects and many of the attendant advantages of this invention will become more readily appreciated and understood by reference to the following detailed descriptions when taken in conjunction with the accompanying drawings wherein:

FIG. 3 is a open top view of the device showing, in schematic representation, the elements as taught by the instant invention having an internal battery source.

FIG. 4 is another open-top view of the device showing placement of the wiring harness and detector.

FIG. 6 & 7 are perspective views of the brackets used in the present invention to secure the battery within the interior of the device.

FIG. 8 is a perspective view of the present invention installed and operational.

FIG. 9 is the electronic circuit component parts list.

DETAILED DESCRIPTION OF THE EMBODIMENT

Refering to FIGS. 1 through 9, there is shown the elements of a livestock containment device, formed in accordance with the present mention, for detecting the presence of livestock near a gate opening 15 of a fence 14, (FIG. 2) and then generating high intensity sound waves to "frighten" them away.

Figure 1:
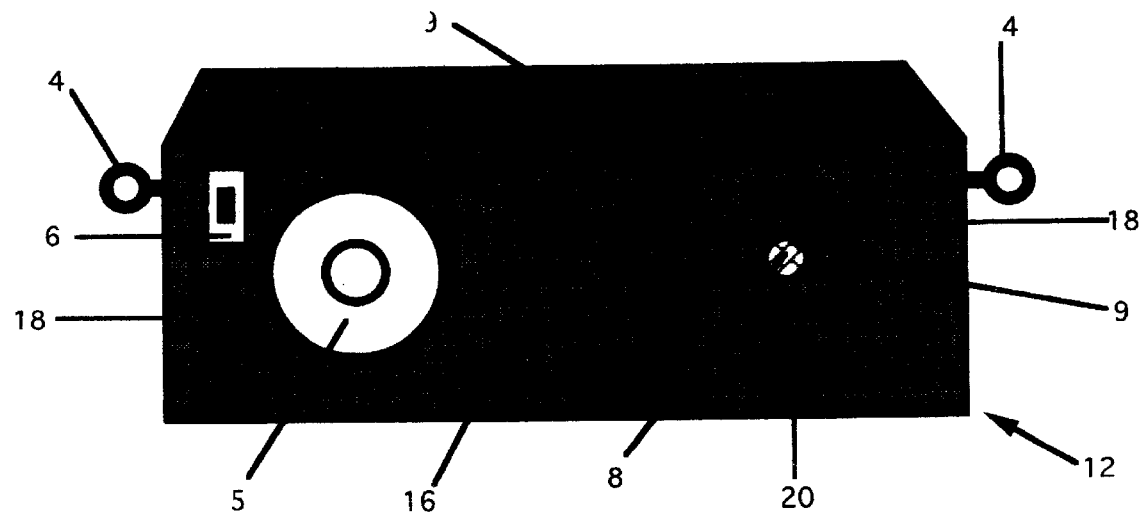
FIG. 1 is a perspective view of the instant invention, with hanging device omitted, showing relevant placement and identification of major components.
Figure 2:
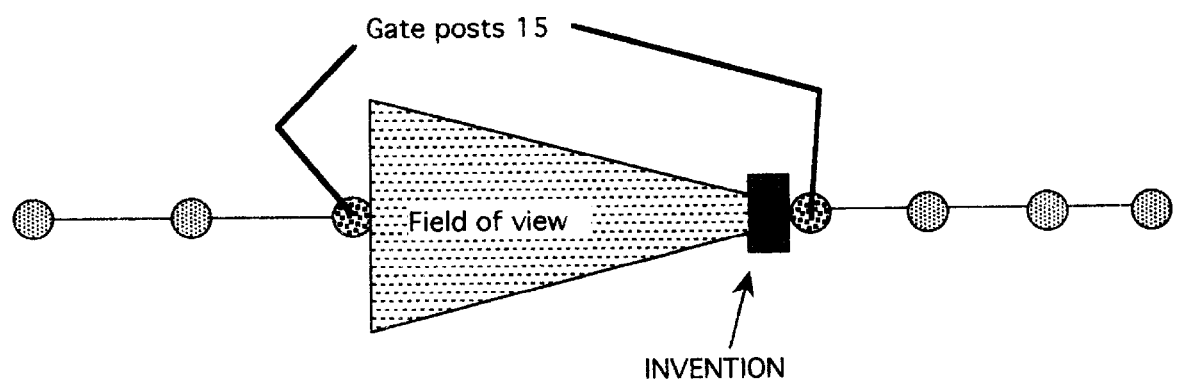
FIG. 2 is a schematic view of the livestock containment device showing it's installation in a typical gate opening and the area protected by the device.
Figure 5:
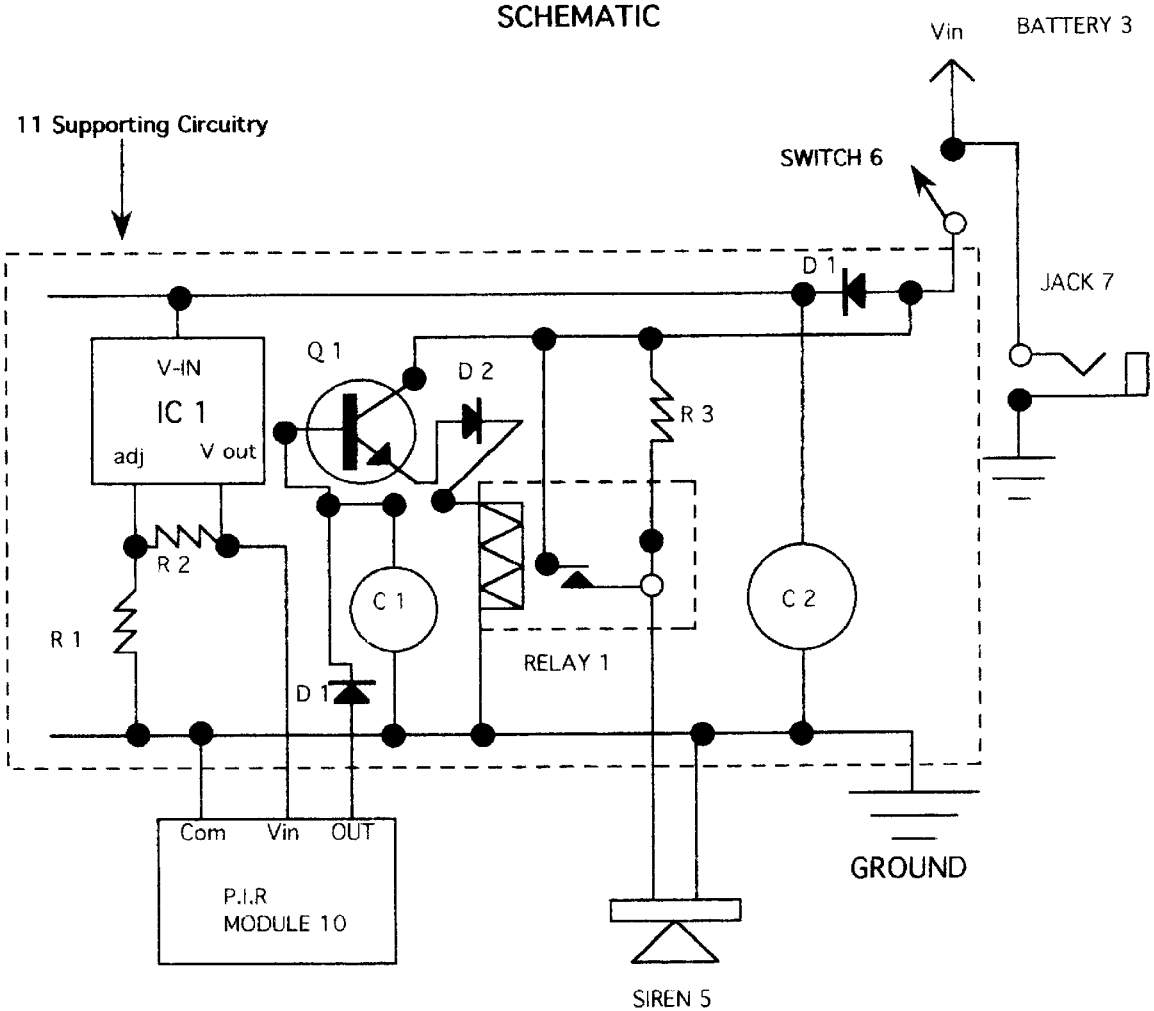
FIG. 5 is a schematic diagram of the circuitry which supports and powers the detector module using conventional electronic representation readily apparent to those skilled in the art.

As shown in FIGS. 1, 3, and 4, the device is comprised of a housing 12 which serves to hold the mechanical and electrical components of the present invention. The housing 12 is substantially rectangular in form and has a plurality of faces, typically a foreword face 16, a rear face 17, two opposing side faces 18, and a top face 19, and a bottom face 20. Enclosed within the housing 12 is a battery 3, a six-tone siren 5, and the associated control circuitry 8, 10, and 11 located inside the detector box 2. Connection between the control circuitry 8, 10, 11, the battery 3, the siren 5, the switch 6, and the charging jack 7 is accomplished via wiring harness A through G described in the WIRING LEGEND of FIG. 4. Electrical power for this livestock containment device is supplied by a seven ampere-hour 12 volt lead-acid battery 3 with gel-type electrolyte having both a positive terminal 2 1 and a negative terminal 22 on the top and is totally sealed and leak proof. Battery 3 is inclosed within housing 12 and is secured with two plastic brackets 23 and 24 (FIG. 6) cut from a plastic tray 25, (FIG. 6) one and one-half inches deep.

The device is hung by a nail 26 (FIG. 8) on a gate post 15 by means of a hanging fixture 27 fashioned from four feet of one-eighth inch aircraft cable attached at each end of the main housing 12 to the hanging brackets 28. The cable is looped through each bracket 28 and secured with swaged cable ferrules 29. A noose 30 is formed in the middle of the cable with a loose sliding ferrule 31 which allows the noose 30 to be moved back an forth on cable 27 if necessary. This ensures that the device will hang straight and plumb with gatepost 15.

Referring to FIG. 4, when switch 6 is thrown to its "on" position, electrical energy flows from battery 3 to the detector module 10 inside detector box 2 via wire F and wire C. After approximately thirty seconds, the detector becomes active. Suitable detectors are available from numerous commercial sources. It will be apparent to those skilled in the art that different brands of detectors will require different supporting circuitry 11 and different wiring hookups A through G.

In this embodiment of the invention, the detector 10 has a fairly wide angle of view. Therefore, a shield 9 was devised to narrow the angle of view in order to minimize false alarms caused by the sun or by livestock coming near the gate but not actually trying to pass through it.

When an animal moves into the detector's 10 field of view (see FIG. 2), infrared heat energy from its body travels to the detector's 10 "eye" through a fresnel lens 8 and is, in turn, sensed by the detector module 10 (FIG. 4). Once the detector 10 has confirmed the presence of heat emitting object or animal, it then emits a positive pulse that lasts 0.5 to 2 seconds and will continue to pulse as long as the heat emitting object or animal remains within the detector 10 module's field of view. The pulse then travels through D 3 (FIG. 5), charges C 1, and then into Q 1, saturating its base, causing Q 1 to turn on. D 3 protects the detector module 10 in the event that Q 1 becomes shorted and positive voltage is allowed to flow from its collector to its base, and ultimately, into the output of the detector module 10, destroying the module 10. Once Q 1's base becomes saturated, power is allowed to flow through Q 1 into D 2 and then into Relay 1's coil thus energizing it. This, in turn, closes Relay 1's contacts and allows power to flow to the siren 5 through wire G in FIG. 4, resulting in the siren 5 producing "frighting, earsplitting and discomforting" sounds. D 2 protects Q 1 from excessive voltages produced by Relay 1's coil (see FIG. 5).

The detector module 10 receives its operating power from IC 1. IC 1 is an adjustable voltage regulator, its output is determined by R 1 and R 2.

C 2 is placed in the circuit 11 (FIG. 5) as a stabilizing power supply, to prevent large current draws (such as when the siren 5 is activated) from interfering with the operation of the module 10. D 1 prevents C 2's charge from being drained into the siren 5 when the siren 5 is activated.

Once the "frighting and discomforting" tones have caused the animal to retreat and leave the detector module's 10 field of view, the detector module 10 will discontinue emitting pulses. Once the detector module's 10 pulses stop, the siren 5 will continue to remain on until C 1's voltage has dissipated through Q 1 to the point that Q 1's emitter voltage drops below 3 volts causing Relay 1 to shutdown. Time to shutdown is determined by the capacitance of C 1. Once Relay 1 opens, the siren 5 will then turn off and the invention will go into standby mode until another heat emitting object or animal moves into the detector module's 10 field of view. Then the aforementioned process will start all over.

INSTALLATION, SETUP AND OPERATION

An important embodiment of the invention is that it is extremely easy to use and install. Referring to FIG. 8, the device is first hung on one gate post 15 so that its "eye" 8 (lens) "looks" toward the other gatepost 15, (the existing gate is left open when using this device) see FIG. 2. The unit should be approximately four feet from the ground, and if possible, oriented so that its "eye" 8 looks away from the sun. This will minimize false alarms and prolong the life of the detector 10. Next, a "bungee" cord is hooked into one of the hangers 28, wrapped around the post 15 and hooked into the other hanger. The unit must be securely attached to the post or wind may cause it to move, resulting in false alarms. Finally, switch the unit on. There will be silence for a short time while the detector 10 imprints the thermo-graphic image it "sees" into its circuit. After 30 to 45 seconds, the unit will emit a short tone. It is now operational and will activate its siren 5 whenever something emitting heat moves into its field of view.

It will be apparent to those skilled in the art, that the foregoing detailed description of the preferred embodiment of the present invention is representative of a type of livestock containment device, for outdoor use, within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

We claim:

1. An outdoor livestock containment device comprising:

a housing member;

a siren located partially within the said housing member;

a means of sensing the approach of livestock in electrical communication with said siren;

a means of relaying electrical power to said siren;

a battery source enclosed within said housing supplying electrical current to said livestock containment device;

a means of recharging said battery source when its supply of electrical energy is depleated; and a means of hanging or mounting said livestock containment device to a gate post.

2. The livestock containment device according to claim 1, wherein said siren is partially enclosed within said housing.

3. The livestock containment device according to claim 1, wherein said battery source is enclosed within said housing having a switch provided and positioned on said housing for turning on and off the electrical current to the device.

4. The livestock containment device according to claim 1, wherein said battery source is capable of delivering seven amps of power at a potential of nine to twelve volts and is capable of being recharged by means of an external jack provided and positioned on said housing.

5. The livestock containment device according to claim 1, wherein the means for sensing is an infrared detector capable of detecting the approach of a large animal in a gate opening of a fence.

6. An outdoor livestock containment device comprising;

a housing member having a plurality of faces;

a six-tone siren partially enclosed within said housing capable of generating high intensity sound which is frightening, discomforting, and ear-splitting to livestock;

an infrared detector enclosed within said housing member in electrical communication with said siren, thereby capable of relaying electrical power to said siren upon detection of the presence of livestock;

an electronic circuit capable of providing an electrical interface between said detector and said siren;

an enclosure for said interface circuit board;

a battery source for supplying electrical power to said livestock containment device enclosed within said housing member;

a means for recharging said battery enclosed within said housing member; and a hanging device constructed from aircraft cable and cable ferrules capable of mounting said housing to a gate post quickly and plumb including situations where the hanging point is off center.

7. The livestock containment device according to claim 6, wherein said battery source is enclosed within said housing.

8. The livestock containment device according to claim 6, wherein said battery is capable of being recharged by means of an external jack positioned on the side of said housing member in direct connection, through a diode, to said battery enclosed within said housing.

9. The livestock containment device according to claim 6, wherein said six-tone siren is partially enclosed within said housing.

10. The livestock containment device according to claim 6, wherein said infrared detector is enclosed within said housing.

11. The livestock containment device according to claim 6, wherein said electronic interface circuit is enclosed within said housing.

12. The livestock containment device according to claim 6, wherein the lens of said infrared detector is surrounded by an external shield allowing said detector to discriminate between the infrared heat from a large animal and the infrared heat from the sun or other objects not within the area protected by the device, thus reducing false alarms.

13. The livestock containment device according to claim 6, wherein the portion of said electronic interface circuit, consisting primarily of C 1 and Q1, allows the said siren to remain on for a predetermined time after said infrared detector has turned off.

14. The livestock containment device according to claim 6, wherein the portion of said electronic interface circuit consisting primarily of R3, causes said siren to produce its six-tones in a non sequential manner which precludes the possibility of livestock becoming desensitized to the sound.

15. The livestock containment device according to claim 6, wherein the said electronic circuit is enclosed within a small plastic box, substantially rectangular in shape, within said housing.

16. The livestock containment device according to claim 6, wherein the said hanging device allows said housing to be mounted to a gate post quickly, easily, and plumb even if hanging point is off center.

17. The method of deterring livestock from passing through open gates comprising the steps of:

positioning a housing member, on a gate post, having enclosed within a siren and an infrared detector capable of sensing the approach of livestock;

sensing the approach of said livestock, thereby signaling and activating said siren;

generating high intensity sound waves to frighten and deter said livestock away from the gate area sought to be protected; and sensing the retreat of said livestock, thereby ceasing said siren from producing high intensity frightening and discomforting sounds.

\* \* \* \* \*